United States Patent
Suzuki et al.

(10) Patent No.: US 9,778,140 B2
(45) Date of Patent: Oct. 3, 2017

(54) ENGINE TESTING APPARATUS, AND ENGINE TESTING METHOD

(75) Inventors: Yasuaki Suzuki, Toyota (JP); Takuya Kusakabe, Toyota (JP); Masato Hayasaka, Toyota (JP); Yoshinao Sato, Toyota (JP); Nobuhiko Asakura, Toyota (JP); Sou Shimizu, Toyota (JP); Yoshimasa Sawada, Kounosu (JP); Takao Akiyama, Takasaki (JP); Shinya Nagao, Toyota (JP); Yoshiharu Kido, Seto (JP)

(73) Assignees: TOYOTA JIDOSHA KABUSHIKI KAISHA, Toyota-shi (JP); MEIDENSHA CORPORATION, Tokyo (JP)

( * ) Notice: Subject to any disclaimer, the term of this patent is extended or adjusted under 35 U.S.C. 154(b) by 338 days.

(21) Appl. No.: 14/004,534

(22) PCT Filed: Mar. 13, 2012

(86) PCT No.: PCT/JP2012/056394
§ 371 (c)(1),
(2), (4) Date: Sep. 11, 2013

(87) PCT Pub. No.: WO2012/124684
PCT Pub. Date: Sep. 20, 2012

(65) Prior Publication Data
US 2014/0019081 A1 Jan. 16, 2014

(30) Foreign Application Priority Data
Mar. 17, 2011 (JP) .................... 2011-059603

(51) Int. Cl.
*G01M 15/00* (2006.01)
*G01L 3/16* (2006.01)
(Continued)

(52) U.S. Cl.
CPC .............. *G01M 15/02* (2013.01); *G01L 3/02* (2013.01); *G01M 17/0072* (2013.01)

(58) Field of Classification Search
CPC ...... G01M 15/02; G01M 15/00; G01M 15/04; G01M 13/00; G01M 17/00; G01N 15/00;
(Continued)

(56) References Cited

U.S. PATENT DOCUMENTS 3,485,093 A * 12/1969 Muller .................... F02P 17/00
  324/169
4,382,388 A *  5/1983 Ono ..................... G01M 15/044
  73/116.05
(Continued)

FOREIGN PATENT DOCUMENTS

CN    101916519 A    12/2010
JP    04-323533 A    11/1992
(Continued)

*Primary Examiner* — Mischita Henson
*Assistant Examiner* — Christine Liao
(74) *Attorney, Agent, or Firm* — Andrews Kurth Kenyon LLP

(57) ABSTRACT

An engine testing apparatus is provided with a memory portion for storing a control command value obtained when the rotation speed of a dynamometer is changed by the control command value in accordance with the change of the engine rotation speed in a real vehicle in a period in which the engine behavior in a real vehicle is reproduced without connecting the dynamometer to an engine under test. The engine testing apparatus is provided with an output portion that supplies the control command value stored in the memory portion to the dynamometer with reference to an engine output signal showing the start of the reproducing period.

10 Claims, 6 Drawing Sheets

(51) Int. Cl.
*G01M 15/02* (2006.01)
*G01L 3/02* (2006.01)
*G01M 17/007* (2006.01)

(58) Field of Classification Search
CPC . G09B 9/04; G05B 11/32; F02B 77/08; F02B 77/00; F02N 15/00; F02N 15/06; F02P 1/00
See application file for complete search history.

(56) References Cited

U.S. PATENT DOCUMENTS

| | | | |
|---|---|---|---|
| 6,634,218 B1 * | 10/2003 | Nakanishi | G01M 15/044 73/116.05 |
| 8,495,908 B2 * | 7/2013 | Nagy | G01M 15/02 73/114.13 |
| 2004/0200463 A1 * | 10/2004 | Ando | F02P 11/06 123/630 |
| 2009/0100919 A1 * | 4/2009 | Sugita | F02D 41/1497 73/114.15 |

FOREIGN PATENT DOCUMENTS

| | | |
|---|---|---|
| JP | 05-172700 A | 7/1993 |
| JP | 08-075613 A | 3/1996 |
| JP | 08-219953 A | 8/1996 |
| JP | 10-176978 A | 6/1998 |
| JP | 2000-314683 A | 11/2000 |
| JP | 2003-057152 A | 2/2003 |
| JP | 2004-177259 A | 6/2004 |
| JP | 2006-300684 A | 11/2006 |

\* cited by examiner

ENGINE TESTING APPARATUS, AND ENGINE TESTING METHOD

CROSS REFERENCE TO RELATED APPLICATION

This is a national phase application based on the PCT International Patent Application No. PCT/JP2012/056394, filed on Mar. 13, 2012, and claims priority to Japanese Patent Application No. 2011-059603, filed on Mar. 17, 2011, all of which are hereby incorporated by reference in their entireties.

FIELD OF THE INVENTION

The present invention relates to an engine testing apparatus provided with a dynamometer connected to an engine under test, and an engine testing method performed by connecting a dynamometer with an engine under test.

BACKGROUND OF THE INVENTION

A conventional testing apparatus used to verify the performance of a vehicle engine is provided with a dynamometer 52 connected to an output shaft of an engine under test 50 as an object to be tested via a coupling 51 as shown in FIG. 9. In this type of the testing apparatus, working load evaluation of the engine under test 50 is performed by reproducing the inertia equivalent weight, the frictional resistance, and the running resistance of a vehicle drive system by the load control of the dynamometer 52. Generally, the control of the dynamometer 52 of such a testing apparatus is performed by comparing the torque of the engine under test 50 measured by an axial torque meter with a target torque such that the measured torque corresponds to the target torque.

Patent Document 1 proposes another conventional engine testing apparatus. In the testing apparatus, the control of the engine under test 50 is performed by feedforward control of the throttle opening degree by an opening degree command. In contrast, the control of the dynamometer 52 is performed by feedforward control that brings an obtained torque signal of the engine under test 50 into a target torque signal, and feedback control that corrects the target torque according to the rotation speed of the engine under test 50.

PRIOR ART DOCUMENT

Patent Document

Patent Document 1: Japanese Laid-Open Patent Publication No. 8-75613

SUMMARY OF THE INVENTION

When performing feedback control of the dynamometer 52 by the torque to coincide the measurement torque with the target torque, a delay is caused from the time when the engine under test 50 generates torque to the time when the torque is reflected on the control of the dynamometer 52. The delay is caused by accumulation of various factors such as a mechanical response delay of a clutch, a response delay of the dynamometer 52, a response delay of a control system of the dynamometer 52, a computation delay of a controller that controls the dynamometer 52, and a measurement delay of the torque. Accordingly, when the engine rotation speed is rapidly changed at the time of starting the engine, the dynamometer cannot reproduce the loads equivalent to those of a real vehicle. Therefore, as shown in FIG. 10, the engine testing apparatus cannot appropriately reproduce the rise of the engine rotation speed at the time of starting the engine in a real vehicle in the test.

In contrast, in the engine testing apparatus disclosed in above-mentioned Patent Document 1, since the torque of the dynamometer 52 is controlled by feedforward, the likelihood of the problem of the above described delay is reduced. However, the timing of the feedforward is not considered so that the engine testing apparatus may assist in the rise of the rotation at the time of starting the engine by the feedforward. The apparatus may control the rise on the contrary. Therefore, in the engine testing apparatus, the engine behavior in a real vehicle may not be reproduced. The relationship between the throttle opening degree and the torque should be accurately grasped in advance to perform the above described control of the dynamometer 52. The creation of a map illustrating the relationship requires much time.

An object of the present invention is to provide an engine testing apparatus and an engine testing method that easily and appropriately reproduce the engine behavior in a real vehicle when the engine rotation speed is rapidly changed at the time of starting the engine or changing the speed.

To achieve the above described object, according to a first aspect of the present invention, an engine testing apparatus configured to be connected to an engine under test and include a dynamometer that is controlled by a control command value is provided. The apparatus comprises a memory portion and an output portion. The memory portion stores a control command value obtained when rotation speed of the dynamometer is changed in accordance with a change of engine rotation speed in a real vehicle during a reproducing period. Engine behavior in a real vehicle is reproduced with the dynamometer disconnected from the engine under test. The output portion supplies the stored control command value to the dynamometer using, as reference, an engine output signal indicating the start of the reproducing period.

According to a second aspect of the present invention, an engine testing method performed in a state in which a dynamometer controlled by a control command value is connected to an engine under test is provided. The method includes a step of: obtaining a change of engine rotation speed in a real vehicle in a reproducing period. Engine behavior in a real vehicle is reproduced. An engine output signal indicates start of the reproducing period. The method further includes the steps of: obtaining a control command value acquired when rotation speed of the dynamometer is changed in accordance with a change of the obtained engine rotation speed with the dynamometer disconnected from the engine under test; and operating the engine under test with the dynamometer connected thereto, and supplying the obtained control command value to the dynamometer using, as reference, the engine output signal indicating the start of the reproducing period.

DETAILED DESCRIPTION OF THE PREFERRED EMBODIMENTS

Hereinafter, an engine testing apparatus and an engine testing method according to an embodiment of the present invention will be described in details with reference to FIGS. 1 to 8.

Figure 1:
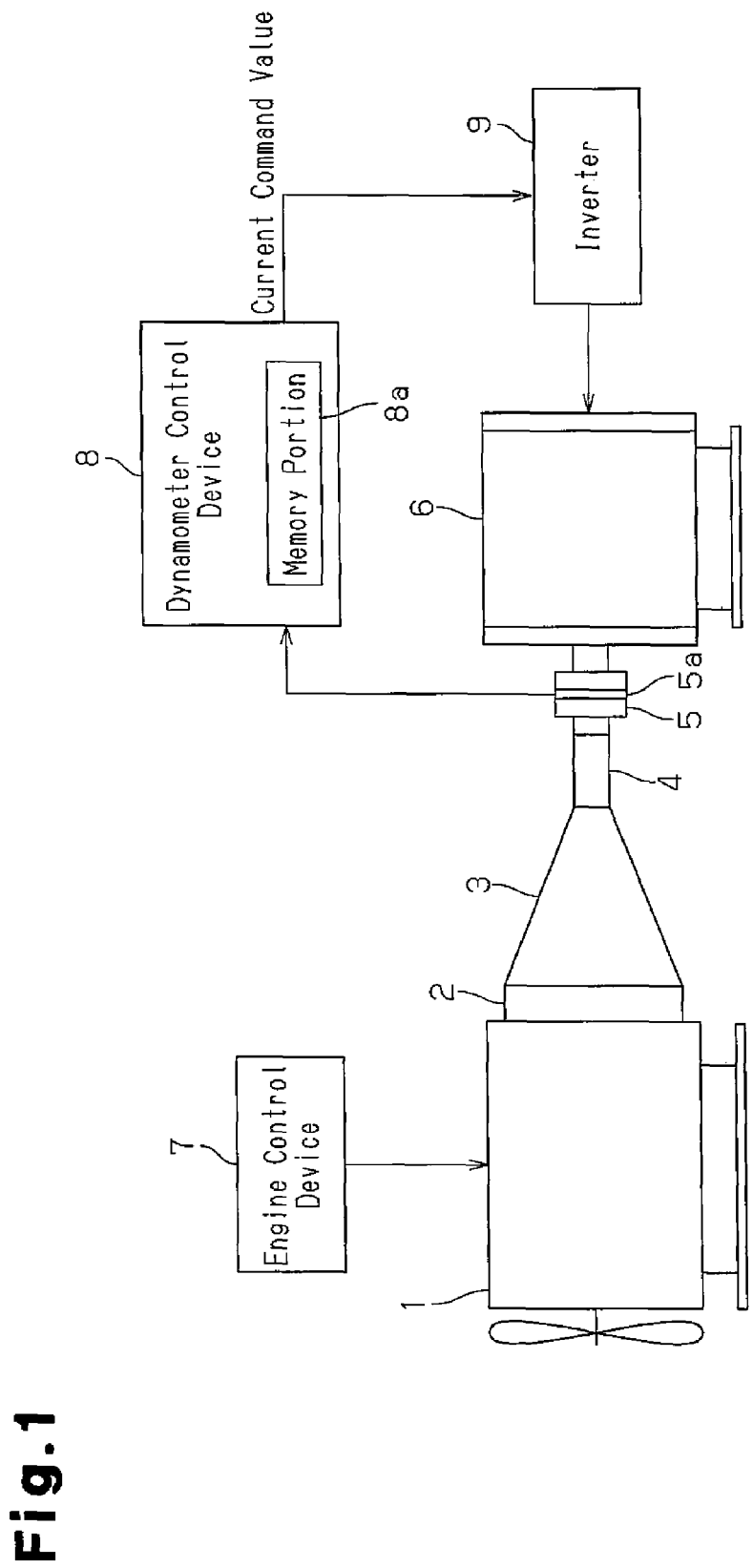
FIG. 1 is a diagram schematically illustrating the configuration of an engine testing apparatus according to an embodiment of the present invention.

First, with reference to FIG. 1, the configuration of the engine testing apparatus according to the present embodiment will be described. As shown in FIG. 1, in the engine testing apparatus, an engine under test 1 is arranged such that it is connected to a manual transmission 3 via a clutch 2. A propeller shaft 4 that extends from the manual transmission 3 is connected to a dynamometer 6 via a coupling 5 so that the engine under test 1 and the dynamometer 6 are connected with each other. An inverter 9 that adjusts the driving current of the dynamometer 6 is provided in the dynamometer 6. Further, an axial torque meter 5a that detects the axial torque applied to the coupling 5 is provided in the coupling 5.

The engine under test 1 is controlled by an engine control device 7. Further, the dynamometer 6 is controlled by a dynamometer control device 8. The detection signal of the axial torque meter 5a is supplied to the dynamometer control device 8. The dynamometer control device 8 is configured to supply the inverter 9 of the dynamometer 6 with a current command value to control the dynamometer 6. A memory portion 8a that stores data for the test is provided in the dynamometer control device 8.

In the engine testing apparatus configured as described above, a test of the engine under test 1 is performed according to each of the following steps:

First step: the change of the engine rotation speed of a real vehicle in the period (here, the engine starting period) in which the engine behavior in a real vehicle is reproduced is obtained, and an initial ignition signal indicating the start of the period is also obtained.

Second step: the current command value of the dynamometer 6 when the rotation speed of the dynamometer 6 without connecting the dynamometer 6 to the engine under test 1 is changed is obtained in accordance with the change of the obtained engine rotation speed.

Third step: the change of the engine rotation speed obtained in the first step and the change of the dynamometer rotation speed in the second step are stacked at a rev-up point to synchronize the initial ignition signal with the command timing of the current command value.

Fourth step: the engine under test 1 is operated in the state in which the engine 1 is connected to the dynamometer 6, and the current command value obtained with the initial ignition signal as reference is supplied to the dynamometer 6 to test the engine under test 1.

Hereinafter, each of the steps will be described.

Figure 2:
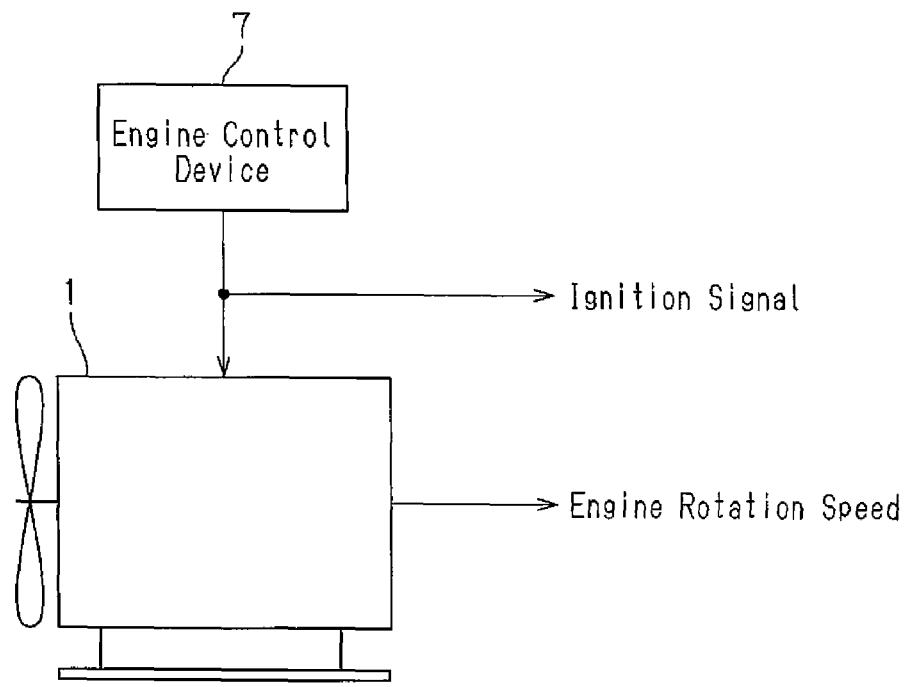
FIG. 2 is a schematic diagram illustrating the state of the testing apparatus in a first step according to the embodiment.
Figure 3:
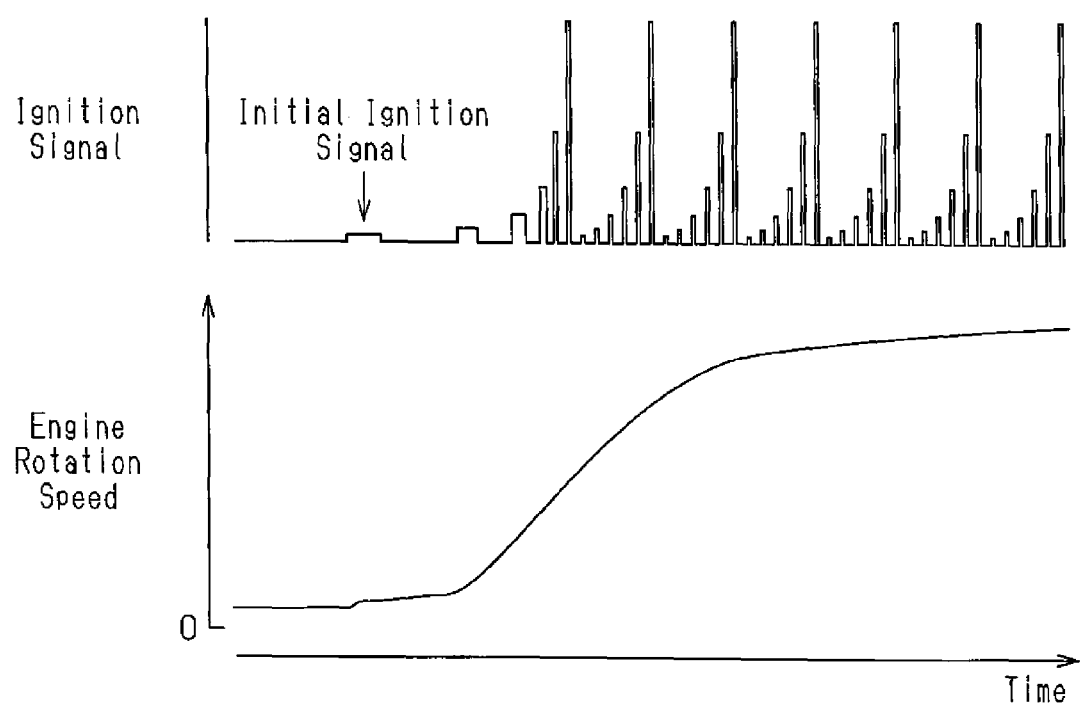
FIG. 3 is a graph showing changes of ignition signals and engine rotation speed obtained in the first step at the time of starting the engine.

The first step is, as shown in FIG. 2, performed by the engine under test 1 alone. In the first step, the engine under test 1 alone is started, and the ignition signal and the engine rotation speed as shown in FIG. 3 are obtained. In the present embodiment, the initial ignition signal of the engine under test 1 is obtained as an engine output signal indicating the start of the engine starting period.

Figure 4:
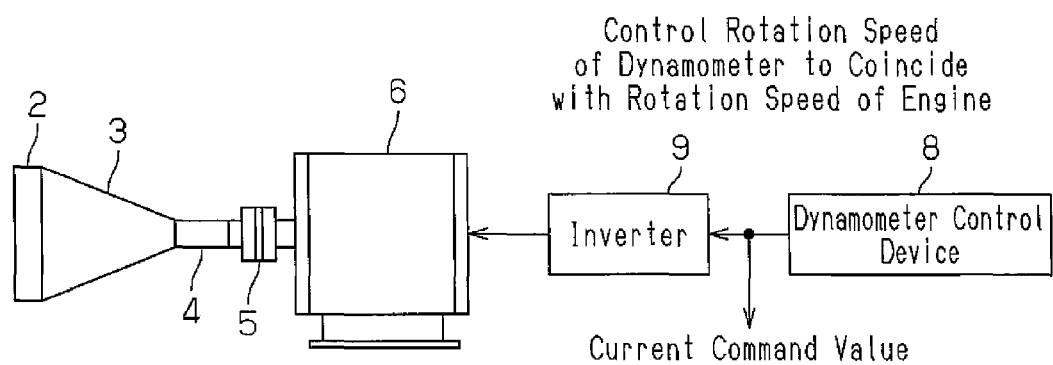
FIG. 4 is a schematic diagram illustrating the state of the testing apparatus in a second step according to the embodiment.
Figure 5:
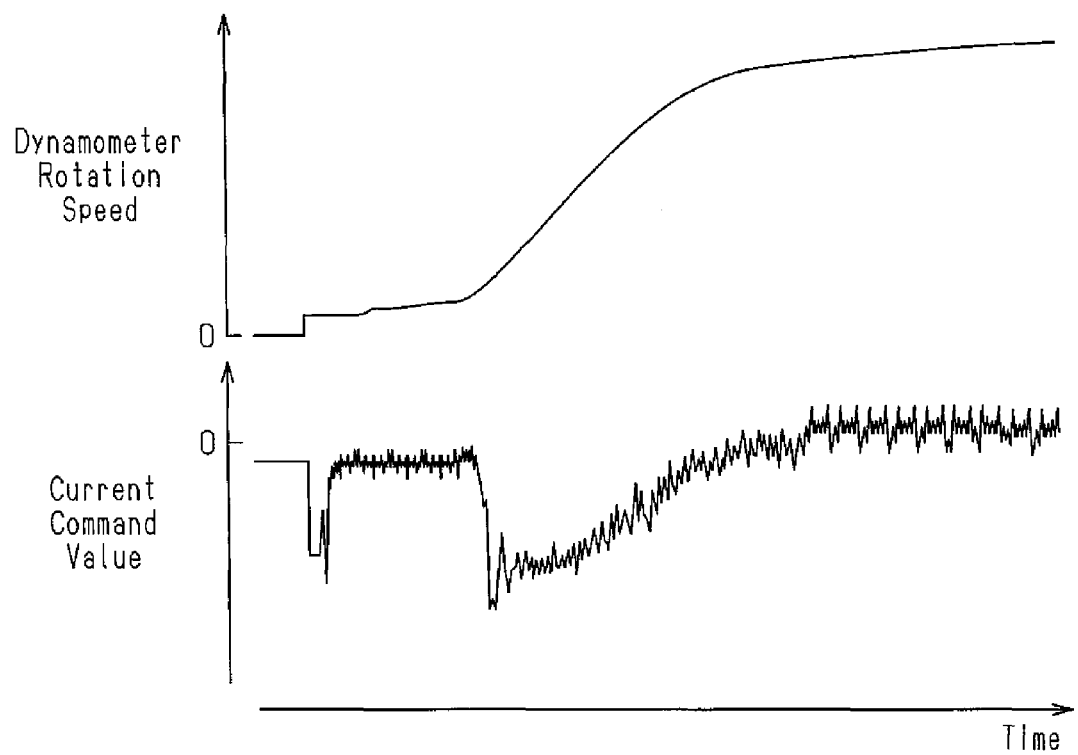
FIG. 5 is a graph showing changes of the rotation speed of a dynamometer and current command values obtained in the second step.

As shown in FIG. 4, the second step is performed in the state in which the engine under test 1 is disconnected from the dynamometer 6. In the second step, as shown in FIG. 5, the rotation speed of the dynamometer 6 is controlled such that the rotation speed of the dynamometer 6 is changed in accordance with the change of the engine rotation speed obtained in the previous first step. The current command value commanded by the dynamometer control device 8 to the inverter 9 is obtained under the above described control of the rotation speed. The obtained current command value is stored in the memory portion 8a of the dynamometer control device 8. The obtained current command value corresponds to a current command value required for generating inertia compensation force of the propeller shaft 4 and the dynamometer 6 in the dynamometer 6 when the rotation speed of the dynamometer 6 is changed in accordance with the change of the engine rotation speed obtained in the first step.

Figure 6:
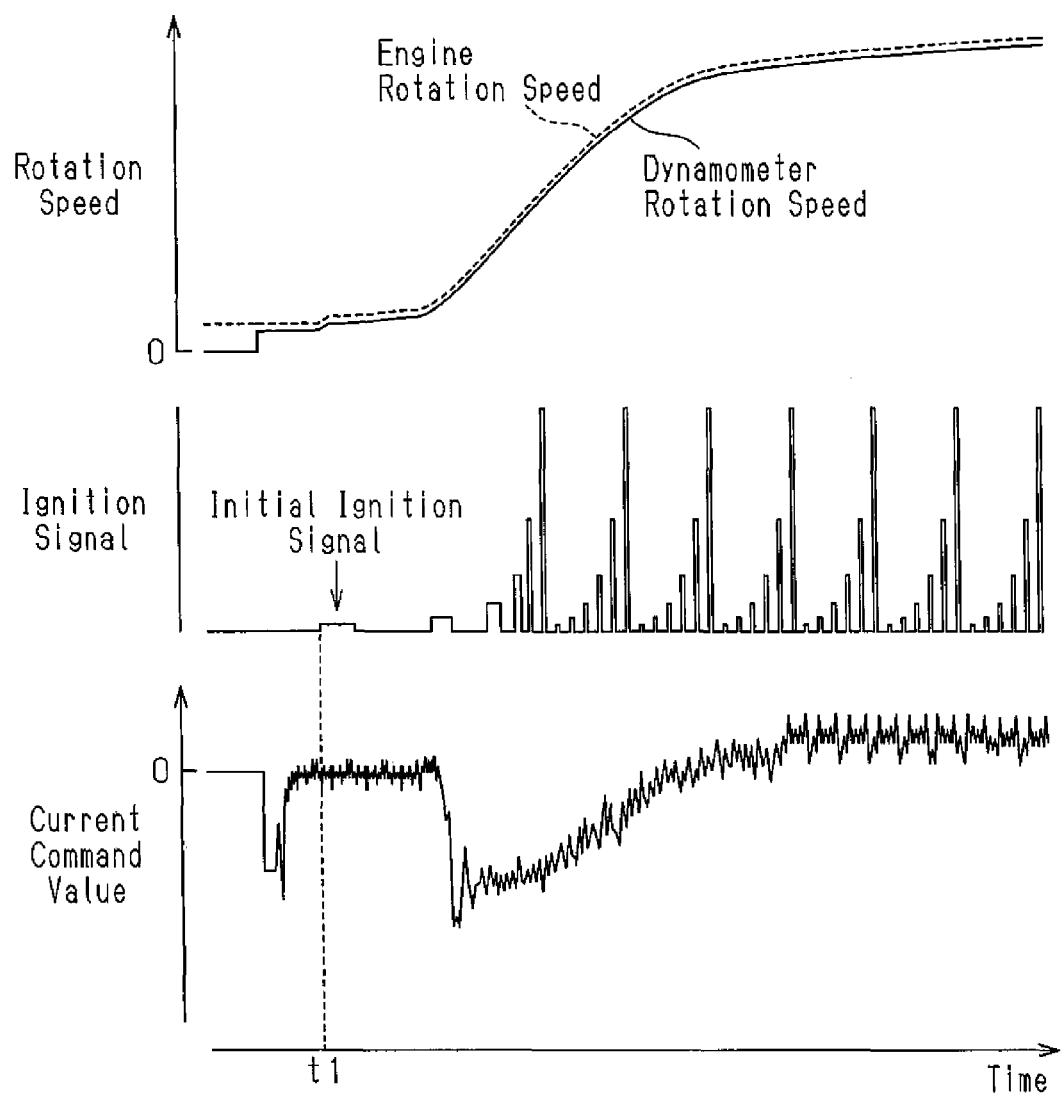
FIG. 6 is a graph showing an aspect of a third step according to the embodiment.

In the third step, as shown in FIG. 6, the change of the engine rotation speed obtained in the first step and the change of the dynamometer rotation speed in the second step are stacked at the rev-up point to synchronize the detection time t1 of the initial ignition signal obtained in the first step with the command timing of the current command value obtained in the second step.

Figure 7:
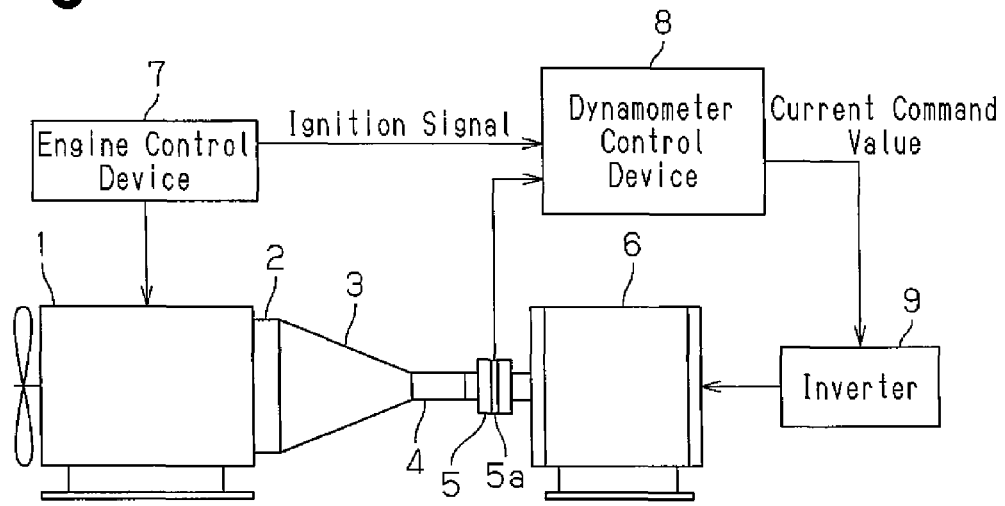
FIG. 7 is a schematic diagram illustrating the state of the testing apparatus in a fourth step according to the embodiment.
Figure 8:
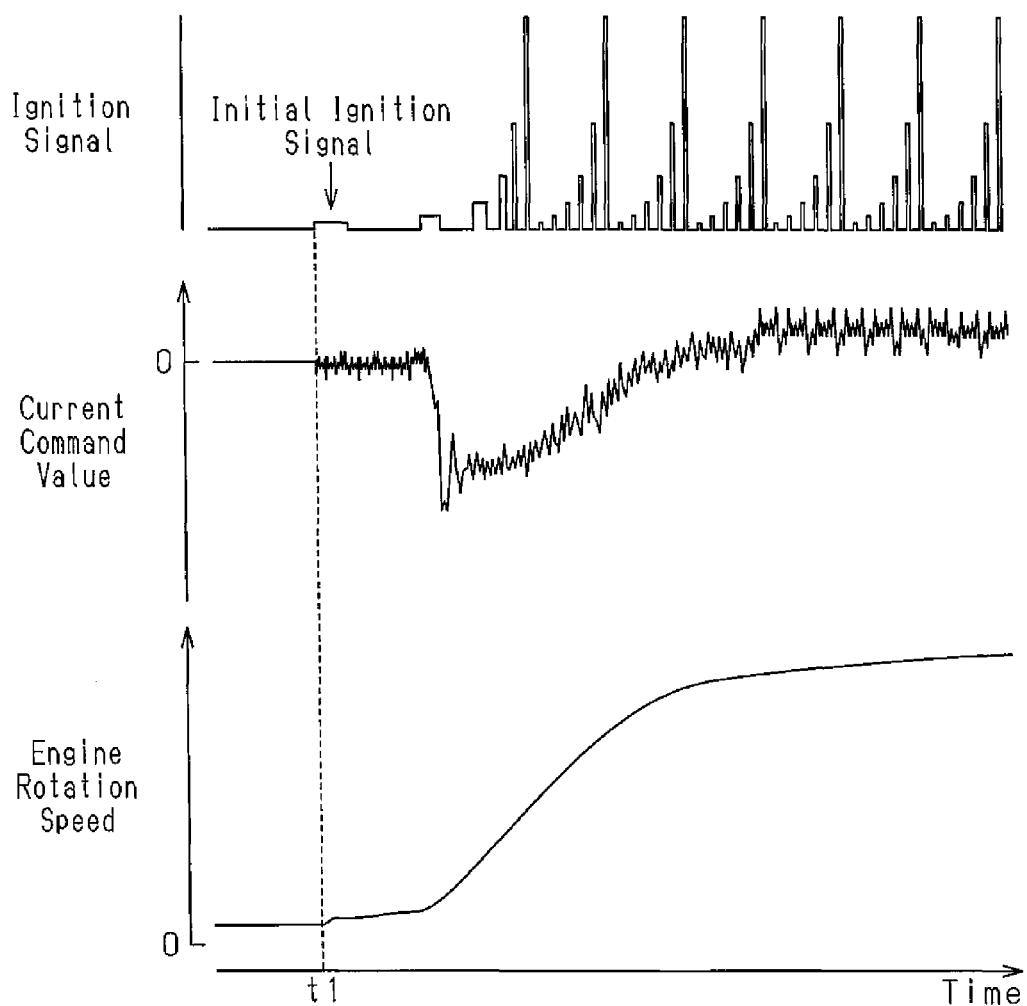
FIG. 8 is a graph showing changes of the ignition signals, the current command value, and the engine rotation speed in the fourth step.

As shown in FIG. 7, the fourth step is performed in the state in which the engine under test 1 is connected to the dynamometer 6 via the clutch 2, the manual transmission 3, the propeller shaft 4, and the coupling 5. In the fourth step, the engine under test 1 is started, and the ignition signal of the engine under test 1 is supplied to the dynamometer control device 8. As shown in FIG. 8, the current command value stored in the memory portion 8a is supplied to the inverter 9 with the detection time t1 of the initial ignition signal of the engine under test 1 as reference. In the present embodiment, a control that generates power in the dynamometer 6 equivalent to a friction in a real vehicle by the feedback control of the dynamometer 6 and a control that reduces the resonance of a spring system such as the clutch 2 are performed on the basis of the detection result of the axial torque meter 5a.

In the above described present embodiment, when testing the engine under test 1 in the fourth step, the dynamometer 6 generates power equivalent to the inertia compensation force of the dynamometer 6 according to the rotation speed thereof at the time, or of the propeller shaft 4. Accordingly, the inertia weight of the dynamometer 6 referenced by the engine under test 1 is set to zero so that a change of the engine rotation speed that is the same as that of a real vehicle is reproduced.

In the above described present embodiment, the memory portion 8a of the dynamometer control device 8 corresponds to a memory portion that stores a control command value (current command value) of the dynamometer 6 when the rotation speed of the dynamometer 6 is changed without being connected to the engine under test 1. Further, in the present embodiment, the dynamometer control device 8 corresponds to an output portion that supplies the dynamometer 6, namely, the inverter 9 of the dynamometer 6, with the control command value (current command value) stored using, as reference, the detection of an engine output signal (initial ignition signal) indicating the start of the engine behavior reproduction period.

The present embodiment has the following advantages.

(1) In the present embodiment, the current command value when the rotation speed of the dynamometer 6 disconnected from the engine under test 1 is changed in accordance with the change of the engine rotation speed in a real vehicle in the period (here, the engine starting period) in which the engine behavior in a real vehicle is reproduced is stored in the memory portion 8a of the dynamometer control device 8. The stored current command value turns into a current command value required for generating the power corresponding to the inertia compensation force of the dynamometer 6 and the propeller shaft 4. In the present embodiment, the current command value stored in accordance with the initial ignition signal indicating the start of the engine starting period is supplied to the dynamometer 6. Accordingly, the inertia weights of the dynamometer 6 referenced by the engine under test 1 and of the propeller shaft 4 are set to zero so that a change of the engine rotation speed that is the same as that of a real vehicle is reproduced. Therefore, according to the present embodiment, the engine behavior in a real vehicle when the engine rotation speed is rapidly changed at the time of starting the engine is easily and appropriately reproduced.

OTHER EMBODIMENTS

In the above described embodiment, the rotation speed of the dynamometer 6 is changed in accordance with the actually measured change of the engine rotation speed at the time of starting the engine in a real vehicle, and the current command value to the dynamometer 6 at the time is obtained to acquire the control command value to be applied to the dynamometer 6 by the feedforward control in the test. The inertia compensation force of the dynamometer 6 and the propeller shaft 4 during the engine behavior reproduction period may be obtained by computation as well. For example, in the case where the rotation speed of the engine under test 1 in a real vehicle during the engine behavior reproduction period is known, the inertia compensation force of the dynamometer 6 and the propeller shaft 4 may be obtained by the following equation (1). In the equation (1), "Jd" shows the inertia weight of the dynamometer 6 and the propeller shaft 4, and "α" shows the rotation acceleration (time differential value of the engine rotation speed) of the engine under test 1.

$$\text{(Inertia Compensation Force)} = Jd \times \alpha \quad (1)$$

Further, in the case where the rotation speed of the engine under test 1 in a real vehicle during the engine behavior reproduction period is not known, for example, the generated torque (torque shown in the drawing) of the engine under test 1 is obtained from the pressure inside a cylinder so that the rotation acceleration of the engine under test 1 can be obtained by a value of the obtained torque. The inertia compensation force of the dynamometer 6 and the propeller shaft 4 may be obtained by the following equation (2). In the following equation (2), "Ti" shows the torque of the engine under test 1 shown in the drawing, "Tfe" shows engine friction, and "Je" shows the inertia weight of the engine under test 1.

$$\text{(Inertia Compensation Force)} = Jd \times (Ti - Tfe)/Je \quad (2)$$

When the control command value of the dynamometer 6 for generating the power equivalent to the thus obtained inertia compensation force is obtained, and the obtained control command value is supplied to the dynamometer 6 synchronizing with an engine output signal such as an initial ignition signal, the engine behavior in a real vehicle is appropriately reproduced.

In contrast, when simulating a vehicle on which an automatic transmission or a continuously variable transmission is mounted, it is necessary to consider the transmission friction. In such a case, the theoretical driving force of the dynamometer 6 is obtained by subtracting the transmission friction from the driving force of the dynamometer 6 required for setting the inertia weight of the dynamometer 6 referenced by the engine under test 1 and the propeller shaft 4 to zero. The theoretical driving force may be obtained by the following equation (3). In the equation (3), "Jd" shows the inertia weight of the dynamometer 6 and the propeller shaft 4, "α" shows the rotation acceleration (state shown in FIG. 2) of the engine 1 alone under test, and "Tf" shows the transmission friction.

$$\text{(Dynamometer Theoretical Driving Force)} = Jd \times \alpha - Tf \quad (3)$$

In the case where the rotation speed of the engine under test 1 during the engine behavior reproduction period is not known, the engine rotation speed in the state in which the engine under test 1 is disconnected from the dynamometer 6 is obtained. The current command value when the rotation speed of the dynamometer 6 is controlled such that the engine rotation speed is a target value is supplied to the dynamometer 6, and the transmission friction is added to the generated power of the dynamometer 6 to appropriately reproduce the engine behavior in a real vehicle. In contrast, when the engine rotation speed of the vehicle on which an automatic transmission or a continuously variable transmission is mounted is known, the current command value when the rotation of the dynamometer 6 is controlled so that the engine rotation speed is a target value is obtained. In this case, the obtained control command value turns into a value corresponding to the dynamometer theoretical driving force including the transmission friction. Accordingly, the value may be supplied to the dynamometer 6 by the feedforward. As described above, the engine testing apparatus and the engine testing method of the present invention may also be used for reproducing the engine behavior of a vehicle on which an automatic transmission or a continuously variable transmission is mounted.

The preferred embodiment may further be modified as follows.

In the above described embodiment, the generated power of the dynamometer 6 is controlled by adjusting the driving current. Alternatively, such a control may be performed by adjusting the driving voltage of the dynamometer 6. In this case, a voltage command value is used as the control command value substituting for the current command value.

In the above described embodiment, the initial ignition signal is used as the engine output signal indicating the start of the engine behavior reproduction period. Alternatively, signals such as an injection signal of the engine under test 1 and the signal of the pressure inside the cylinder may also be used as the engine output signal, similar to the initial ignition signal.

In the above described embodiment, the description is given in which the test is performed such that the engine behavior when starting the engine is reproduced. Similar methods may be used for reproducing the engine behavior during a period including the time of changing the speed. In this case, signals such as the initial ignition signal, the injection signal, and the signal of the pressure inside the cylinder after a shift signal is changed may be used as the engine output signal indicating the start of the engine behavior reproduction period.

Figure 9:
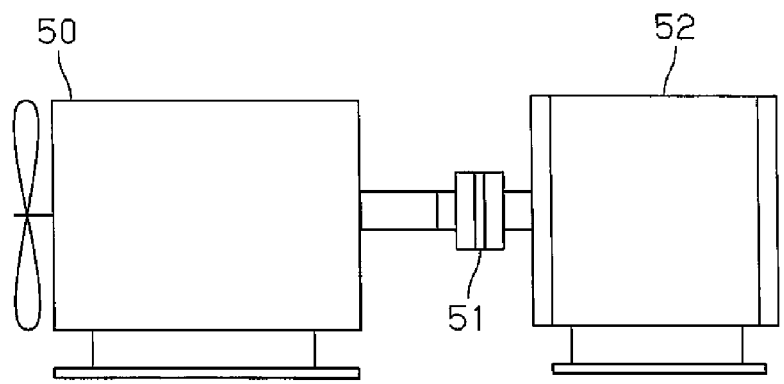
FIG. 9 is a diagram schematically illustrating the configuration of a conventional engine testing apparatus.
Figure 10:
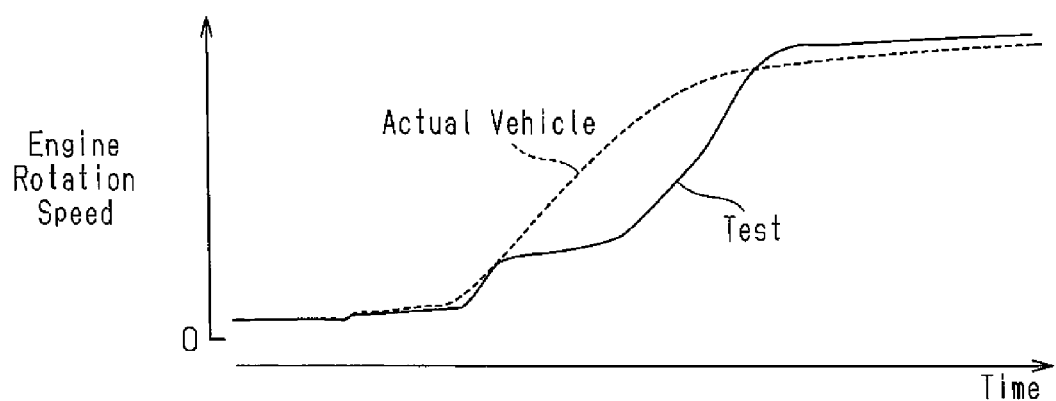
FIG. 10 is a graph showing changes of the engine rotation speed in a real vehicle and in a test in the conventional engine testing apparatus.

The engine testing apparatus and the engine testing method according to the present invention may similarly be applied to the engine testing apparatus configured such that the engine under test and the dynamometer are connected with each other without intervening the transmission or the clutch as shown in FIG. 9, for example.

The invention claimed is:

1. An engine testing apparatus configured to be connected to an engine under test and include a dynamometer that is controlled by a control command value, the apparatus comprising:
    a memory portion that stores the control command value obtained when a rotation speed of the dynamometer, with the dynamometer disconnected from the engine under test, is changed in accordance with an engine rotation speed of a real vehicle, the engine rotation speed being obtained during a reproducing period during which an engine behavior of the real vehicle is reproduced; and
    an output portion that supplies the stored control command value, starting at a detection time, to the dynamometer connected to the engine under test, the detection time being determined by stacking up the rotation speed of the dynamometer and the engine rotation speed and synchronizing with an engine output signal indicating a start of the reproducing period with the control command value,
    wherein a change of the rotation speed of the dynamometer and a change of engine rotation speed are stacked at a rev-up point,
    wherein the control command value is obtained by setting an inertia weight of the dynamometer and a propeller shaft referenced by the engine under test to zero thereby reproducing a change of the engine rotation speed that is the same as that of the real vehicle.

2. The engine testing apparatus according to claim 1, wherein the output portion uses any of an ignition signal, an injection signal, and a signal of a pressure inside a cylinder as the engine output signal.

3. The engine testing apparatus according to claim 1, wherein the control command value is obtained by actually driving the dynamometer in accordance with the engine rotation speed without connecting the dynamometer to the engine under test.

4. The engine testing apparatus according to claim 1, wherein the control command value is obtained by computation on a basis of at least one of a rotation acceleration of the engine under test and a transmission friction.

5. The engine testing apparatus according to claim 1, wherein the reproducing period includes a starting period of the engine under test or a time of changing gears of a transmission.

6. An engine testing method performed in a state in which a dynamometer controlled by a control command value is connected to an engine under test, the method comprising the steps of:
    obtaining an engine rotation speed of a real vehicle during a reproducing period, during which an engine behavior of the real vehicle is reproduced, and an engine output signal indicating a start of the reproducing period;
    obtaining the control command value when a rotation speed of the dynamometer, with the dynamometer disconnected from the engine under test, is changed in accordance with the engine rotation speed;
    determining a detection time by stacking up the rotation speed of the dynamometer and the engine rotation speed and synchronizing the engine output signal indicating the start of the reproducing period; and
    operating the engine under test with the dynamometer connected thereto, and supplying the control command value, starting at the detection time, to the dynamometer,
    wherein a change of the rotation speed of the dynamometer and a change of engine rotation speed are stacked at a rev-up point,
    wherein the control command value is obtained by setting an inertia weight of the dynamometer and a propeller shaft referenced by the engine under test to zero thereby reproducing a change of the engine rotation speed that is the same as that of the real vehicle.

7. The engine testing method according to claim 6, wherein any of an ignition signal, an injection signal, and a signal of a pressure inside a cylinder is used as the engine output signal.

8. The engine testing method according to claim 6, wherein the control command value is obtained by actually driving the dynamometer in accordance with the engine rotation speed without connecting the dynamometer to the engine under test.

9. The engine testing method according to claim 6, wherein the control command value is obtained by computation on a basis of at least one of a rotation acceleration of the engine under test and a transmission friction.

10. The engine testing method according to claim 6, wherein the reproducing period includes a starting period of the engine under test or a time of changing gears of a transmission.

* * * * *